United States Patent Office 3,795,631
Patented Mar. 5, 1974

3,795,631
GLASS-FIBER-REINFORCED ZEOLITE GRANULATES
Gerhard Heinze, Schildgen, and Gerhard Reiss, Friedrich Schwochow, and Günter Ulisch, Leverkusen, Germany, assignors to Bayer Aktiengesellschaft, Leverkusen, Germany
No Drawing. Filed May 5, 1971, Ser. No. 140,607
Claims priority, application Germany, May 27, 1970,
P 20 25 893.9
Int. Cl. B01j 11/40
U.S. Cl. 252—455 Z                         7 Claims

ABSTRACT OF THE DISCLOSURE

Glass fibers in the amount of about 0.3 to 10% by weight of solids are included in a suspension of zeolite and amorphous binder, such as silica sol, which is gelled and converted into granulates in known manner. If the nature of the binder permits, it can be converted to zeolite in the granulates, as by treatment with sodium aluminate, so that the granulates comprise only zeolite and glass fiber. The novel zeolite granulates shrink less during drying and are characterized by high impact strength and by resistance to breaking under fluctuating thermal stresses.

---

The present invention relates to novel zeolite granulates of improved properties and to processes for their production.

Molecular sieve zeolites are being used to an ever increasing extent as adsorbents in adsorption technology. The zeolites which accumulate during synthesis in the form of finely crystalline powders have to be converted into a granulate form before they can be used in adsorption installations. A large number of materials is described in the literature as binders for the granulation of zeolites, the binder comprising about 10 and 30% by weight based on the dry solids. Of these numerous materials, two groups have acquired particular significance in adsorption technology.

The first group comprises clay substances such as for example kaolins, bentonites, attapulgus clays, i.e. substances consisting to a large extent of crystalline clay minerals such as kaolinite, montmorillonite, attapulgite and similar minerals. By virtue of their laminar lattice structure, minerals of this kind develop plastic properties in moist mixtures and can subsequently be hardened by baking, i.e. by heating to temperatures above 500° C., a technique that is very widely used in the ceramic industry.

The second group of binders includes amorphous, gel-like substances such as, for example, amorphous aluminum hydoxide and silica gels. The silica gel can be obtained by hydrolyzing esters of silicic acid, by neutralizing alkali metal silicate solutions or by sol/gel conversions from silica hydrosols.

In addition to these two groups of binder-containing granulates, binder-free zeolite granulates have recently acquired considerable interest. Since they consist solely of zeolite and contain only adsorbing components, they are distinguished by their outstanding adsorption capacity. They are obtained by chemically reacting preformed structures, for example consisting essentially of meta kaolin, with sodium hydroxide or by subsequently converting the binder in granulates originally containing binders into zeolite.

In producing the granulates, it is desirable to obtain outstanding mechanical stability coupled with high adsorption and desorption rates in the zeolite crystals accommodated inside the granules. In other words, a widely branched system of macropores or feed pores must be present, offering only very low resistance to the diffusion of the molecules to be adsorbed. The binder content, if any, should be as small as possible because the binder does not make any contribution towards adsorption and thus reduces the capacity. In addition, the powder density of the granulates should not be too low because it is not the capacity of the adsorbent based on weight but rather the capacity of the adsorbent based on volume which is one of the decisive factors governing capital investment in an adsorption installation. Naturally there are limits to the simultaneous satisfaction of all the aforementioned requirements. In practice, therefore, greater importance is attached to one or other of the properties in the production of zeolite granulates, depending upon the purpose for which they are to be used. Granulates with a particularly high apparent density have of necessity a fairly limited degree of macroporosity. They are distinguished not only by a lower rate of adsorption, but also in many cases by a basically desirable high breaking hardness. In contrast, lighter granulates with a large number of macropores are generally not as hard as the more compact or dense settings, but have the advantage of a higher rate of adsorption.

In general, very stringent demands are imposed upon the mechanical stability of the granulates. Firstly they are required to have a smooth, abrasion-resistant surface to prevent contamination of the product streams and to avoid the formation of crusts on fittings by the zeolite dust. Resistance to abrasion is measured by vibratory apparatus in which dry or liquid-covered granulate is exposed to mechanical vibration for a certain period of time. The weight of the component which passes through a prescribed mesh screen fabric during subsequent sifting is known as the "abrasion" component.

Secondly, the granules are required to show outstanding "breaking hardness" to ensure that they do not shatter when introduced into the adsorption towers which in many cases are several meters tall. The breaking hardness is frequently characterized by that load (measured in kg.) at which a granule shatters. Breaking hardness is measured by means of spring balances in which individual grains are exposed to an increasing load between flat plates. The load indicated at the moment the granule shatters is known as the breaking hardness. In order to correct statistical fluctuations, a relatively large number of individual granules is crushed and the average value subsequently derived.

Thirdly, a number of additional stresses occurs in cases where adsorption installations regenerated in cycles are used. The actual fluctuation in temperature represents only one of the influences among their effects upon the strength of the granulate. In drying installations, the adverse effect of the frequent change in temperature is further promoted by the steam which is liberated during regeneration and which, at elevated temperatures, can produce irreversible changes in the zeolite crystals themselves and also in the binder substance, resulting ultimately in a loosening of the structure of the granules. Another particular difficulty which is encountered in many gas-drying installations is that stray water simply cannot be avoided, emanating from inadequate separation of the water condensed out of the gas during compression and cooling. When water droplets come into contact with the regenerated adsorbent, the heat of adsorption suddenly released results in local surges of heat which can shatter the granules. This phenomenon is generally known in the case of silica gels and, in this particular case, has resulted in the development of special types which, although unaffected by spray water, nevertheless have a considerably reduced adsorption capacity. Finally, the regeneration of zeolite adsorbers saturated with $H_2O$ is also inevitably accompanied by the formation of condensing water droplets on the even colder layers of the adsorbent.

The ability of the zeolite granulates to withstand the stresses discussed in the preceding paragraph is collectively referred to in the following as their "resistance to changes in temperature." In contrast to the previously discussed properties, namely "abrasion resistance" and "breaking hardness," there are no methods by which this particular property can be quantitatively determined both accurately and at the same time, easily. Unfortunately, the well defined "breaking hardnesses" also give little information about the stability of granules under fluctuating thermal stresses or in the event of sudden heating of the kind which occurs when water droplets come into contact with active granulate. On the contrary, it has been found that in many cases it is actually granulates which have a high breaking hardness that are sensitive to alternating thermal stresses, i.e. show little strength in terms of their long-term behavior in adsorbers. In addition, granulates of high powder density and limited macroporosity are usually more sensitive to alternating thermal stresses than lighter granulates with a wide open macropore structure.

A simple more qualitative test by which stability to stray water can be assessed is to drop individual activated granules into a glass beaker filled with cold water. This test is referred to in the following as the "splitting" test. Experience has shown that the behavior of the granules in the so-called "splitting test" is substantially consistent with the results of the involved testing of the long-term behavior under simulated practical conditions, so that the "splitting test" is suitable for use as a method of selection.

A more detailed description of the tests applied to the granulates according to the invention to determine their long-term behavior, extending over several weeks, is given in Example 5, hereinbelow. After a relatively large number of loading and regeneration cycles, less stable granulates are found to contain fine cracks while in the event of more serious damage, individual granules actually disintegrate into more or less large fragments which can be sifted out. The component by weight of fragments sifted out can be used as a measure of the sensitivity of the granulate. In some cases, granules which already contain fine, hairline cracks visible with the naked eye give extremely good results when their "breaking hardness" is measured because it is very much a matter of chance at what angle the bearing pressure acting between the flat plates is directed in relation to the individual hairline cracks present. By contrast, the hairline cracks in granules of this kind ultimately result in shattering under the effect of impacts of the kind that occur in the "drop test." In the "drop test," individual granules are allowed to drop from a height of one meter onto glass plates, and the percentage of shattered granules is recorded.

To summarize, the following can be said of the testing methods:

Abrasion resistance and breaking hardness are quantitatively determined by methods which are easy to carry out. Outstanding resistance to abrasion and a breaking hardness of at least a few kg. are essential requirements for the use of zeolite granules in adsorption installations. However, they are not sufficient for assessing resistance to changes in temperature and hence long term behavior. To test the resistance to changes in temperature, it is possible on the one hand to apply the very simple more qualitative test known as the "splitting test," on the other and long-term tests carried out under simulated practical conditions are both expensive and time-consuming.

Granulates of the individual varieties of zeolite show differences in regard to their resistance to changes in temperature. Experience has shown that granulates of potassium-exchanged zeolite A with a pore diameter of approximately 3 A. are more sensitive than similarly prepared granulates of sodium zeolite A with a pore diameter of 4 A. or the corresponding calcium-exchanged product with a pore diameter of 5 A. There is no clear explanation for this difference. It is also known that granulates of relatively large dimensions, for example with a diameter of 5 mm., are more sensitive than smaller granulates, i.e. granulates with a diameter of from 1 to 2 mm.

Granulates of potassium-exchanged zeolite A are widely used for drying cracking gases because by virtue of their pore width of approximately 3 A. they selectively adsorb water whereas unsaturated hydrocarbons are unable to penetrate into the cavity system of these zeolites because of their size. By contrast, the adsorbent silica gel and aluminum oxide which previously had been exclusively used for drying cracking gases co-adsorb the hydrocarbons, especially the unsaturated hydrocarbons, as well, in addition to the water so that the $H_2O$ loads which can thus be obtained in practice are comparatively low by virtue of the influence which co-adsorption has. Furthermore, the co-adsorbed unsaturated hydrocarbons show a tendency to form non-volatile polymers at the temperatures required for regeneration, resulting in a sudden decrease in capacity. Accordingly, there is considerable interest in using zeolite granulates and, more particularly, potassium-exchanged zeolite granulates, for drying cracking gases.

A process for hardening molecular sieve units containing clay binders is already known from German patent specification No. 1,186, 448. In this process, agglomerates containing molecular sieves and clay in a ratio by weight of from 9:1 to 3:1, are impregnated with an alkali metal silicate solution and then hardened by baking at a temperature of at least 343° C., but below the temperature at which the crystalline zeolitic molecular sieve loses its structural stability. In this process, therefore, more binder is subsequently introduced into an already completed clay-bonded zeolite granulate for hardening purposes, involving an additional operation. Also, the macropore system originally present in the granulate is as it were welded by the sodium silicate, resulting ultimately in lower rates of absorption due to interference with diffusion which this causes. It was also found that in some cases the selective adsorption capacity of the molecular sieve changes during the process (column 1, lines 29 to 35).

In another known process for the production of breakage-resistant zeolite agglomerates, described in DOS 1,931,652, a moldable composition is produced from about 5 to 95% by weight, based on the dry weight, of a crystalline zeolitic molecular sieve with water and a binder consisting of about 2 to 90%, based on the dry weight, of asbestos fibers and about 98 to 10% of clay of which at least about 10% consists of a bentonite clay, subsequently molded into an agglomerate of the required shape and the agglomerate thus obtained is calcined at a temperature of at least about 400° C. but is below the limit at which the structure of the crystalline zeolitic molecular sieve is unstable. Crystalline clay minerals like the montmorillonite present in the bentonites show some catalytic activity and are therefore unsuitable for use as binders for zeolites of the kind used for treating substrates with a considerable content of olefins, diolefins and acetylenes such as cracking gases for example, owing to the fact that they promote polymerization. Another disadvantage of this particular process is that, to harden the granulates, it is necessary to apply baking temperatures which are harmful to the crystallinity of certain zeolites and hence to their adsorption capacity. These particularly heat- sensitive zeolites include the potassium-exchanged zeolites of type A with a pore diameter of 3 A. used for drying cracking gases, in respect of which regeneration temperatures of only 200 to 230° C. are generally being recommended in practice.

It is accordingly an object of the invention to provide zeolite granulates possessing the desirable attributes of known zeolites and also improved resistance to temperature changes.

These and other objects and advantages are realized in accordance with the present invention wherein glass fibers are incorporated into the suspension from which the zeolite is made, in an amount to constitute from about 0.3 to 10% based on the weight of the anhydrous granulate.

The zeolite preferably consists of potassium-sodium zeolite A with a pore width of approximately 3 A. and a $K_2O:(K_2O+Na_2O)$ ratio of 0.2 to 0.7.

The invention also relates to a process for producing these zeolite granulates which is distinguished by the fact that powdered crystalline zeolites in admixture with amorphous binders and glass fibers are converted into granulates, the glass fibers being used in a quantity of from about 0.3 to 10% by weight and preferably in a quantity of from about 1 to 3% by weight, based on the anhydrous granulate.

Surprisingly, it has been found that zeolite granulates of high mechanical stability and, more particularly, with a high resistance to changes in temperature, can be obtained by the process according to the invention despite the fact that, in contrast to conventional processes, there is no need for high baking temperatures. Another advantage of the process according to the invention is that only very small quantities of glass fibers need be used to obtain the required effect and that, in one advantageous embodiment of the process, binder-free zeolite granulates can be obtained which consist almost entirely of absorbing zeolites.

Glass fibers are a catalytically and chemically inactive material which by virtue of their outstanding strength properties are widely used for reinforcing thermoplastics and duromers, especially polyester resins. The standard commercial qualities of the textile glass fibers used for strengthening purposes have individual filament diameters of from about 3 to 15 $\mu$m., tensile strengths of from about 125 to 290 kg./mm.$^2$ and E-moduli of substantially 7000 kg./mm.$^2$. Glass fibers of different chemical composition and adjustment are suitable for use in the process according to the invention. Although particularly thin fibers have an even better strengthening effect, it is preferred to use the very extensively produced fibers of chemically resistant glass, preferably low-alkali borosilicate glass fibers known as E-glass or electrical grade glass, with a diameter of approximately 10 $\mu$m. The fibers are used in the form of chopped strands of ground fibers.

In the practical application of the process according to the invention, the glass fibers are added to the mixture of crystalline zeolite and amorphous binder before conversion into granulates. To obtain a uniform level of distribution, the glass fibers can initially be carefully mixed with the binder and the mixture thus obtained subsequently combined with the crystalline zeolite. It is also possible with equal effect initially to mix the glass fibers with the zeolite component. It is of advantage for example to stir the glass fibers into the aqueous suspension of the zeolite obtained during the synthesis thereof and then to filter the resulting product, or to add the fibers to the synthesis mixture before the zeolite crystals are actually formed.

Any granulating techniques may be used for the purposes of the invention providing they use amorphous binders. Silica gel is preferably used as binder because its subsequent conversion into zeolite makes it possible to obtain binder-free zeolite granulates with an increased adsorption capacity. Zeolite granulates in bead form bonded with silica gel can be obtained, for example, by the process disclosed in German patent specification No. 1,165,562 using silica sol. In this known process, the powdered molecular sieve zeolites to be bonded are stirred with an aqueous stable silica sol whose $SiO_2$ particles have a specific BET surface of from about 150 to 400 m.$^2$/g. and whose $SiO_2$ content amounts to at least about 10% by weight, optionally following the addition of an acid to form a free-flowing suspension with a pH value of from about 8.2 to 9.0, the resulting product mixed with comparatively small quantities of a second suspension of finely divided magnesium oxide in water and the resulting gelable mixture which still retains its free-flow properties subsequently dispersed in the form of droplets in a liquid immiscible with water, as a result of which sol/gel conversion takes place. The resulting granulates are then separated off from the liquid, dried and optionally hardened by heat treatment. By way of modification of the conventional process, glass fibers are added solely to the silica sol/zeolite suspension before it is converted into bead form in quantities of from about 0.3 to 10% by weight and preferably in quantities of from about 1 to 3% by weight, based on the finished, activated granulate. Contents lower than about 0.3% do not produce the required improvement in stability. Contents greater than about 10% do not produce any appreciable increase in strength and are of no interest both for economical reasons and also on account of the percentage reduction in the adsorption capacity of the granulates.

The particular quantity within the above range in which the glass fibers are added is governed by the purpose for which it is intended to use the granulates and is also determined by the properties which the analogous granulates of the particular zeolites and binders, but without any glass fibers present in them, are required to show.

It has been found that the addition of glass fibers reduces the extent to which the moist granules shrink during drying in comparison with the same granules without any fibers present in them. Accordingly, the irregularly distributed fibers prevent excessive shrinkage of the mass of granules by virtue of the fact that they support one another and, in this way, actually contribute towards the development of the porous, substantially tension-free, coarse structure. However, the improvement in breaking resistance under fluctuating thermal stresses cannot be solely attributed to this effect because other fiber materials such as, for example, asbestos fibers and cellulose fibers, similarly effect reduced shrinkage but do not allow the required effect of greater resistance to changes in temperature to be obtained in the same measure as the glass fibers. A more or less pronounced shrinkage is reflected in the powder densities of the granulates.

After drying, the glass-fiber-containing granulates are activated at that temperature which is sufficient for activating the particular types of zeolite. There is no need for consolidation by baking at elevated temperatures.

The glass-fiber-reinforced granulates can also be subjected in known manner to ion exchange or alternatively can be converted by reaction with a solution of sodium aluminate and sodium hydroxide by the process disclosed in German patent specification No. 1,203,238, into substantially binder-free granulates which, apart from the content by weight of fibers amounting to between about 0.3 and 10%, consist solely of adsorbing zeolite. In the process disclosed in the aforementioned German patent specification, the silica-bonded molecular sieve moldings are treated at a temperature of from about 20 to 100° C. with an aqueous solution containing per mol of binder, based on $SiO_2$, at least about 0.5 mole of $Al_2O_3$ in the form of aluminate and from about 1.5 to 10 moles of alkali metal hydroxide per liter. The silica-bonded molecular sieve moldings are preferably produced by the process described in German patent specification No. 1,165,562. These binder-free granulates can also be converted in turn into other types by ion exchange. More particularly, it is possible in this way to obtain substantially binder-free, potassium-exchanged zeolite granulates of type A with a pore diameter of approximately 3 A.

It is known that the reinforcing effect of glass fibers in plastics is governed to a large extent by the quality of the bond between the fibers and the polymer. It is common practice to apply special adhesion promoters to the fibers before they are used. Surprisingly, a bond of sufficient strength is formed between the glass fibers and the inorganic granule substance in the absence of any special measures. The fact that a bond of high strength is actually formed can be established by examining size-reduced granulates under a microscope. It is only the odd glass fiber which projects from the fractured surfaces whereas the majority break together with the matrix in one surface.

The process according to the invention is illustrated by the following examples.

EXAMPLE 1

(I) Granulation 126 g. of ground E-glass fibers 10 μm. thick with an average length of approximately 250 μm. were dispersed by means of an intensive mixer in 2380 ml. of an aqueous silica sol which had been acidified with 15 ml. of 5 normal hydrochloric acid and diluted with 710 ml. of $H_2O$. The silica sol had a density of 1.20 g./ml., an $SiO_2$ content of 30% and a specific BET surface of the $SiO_2$ particles of 200 m.$^2$/g.; 2380 ml. of silica sol contained 857 g. of $SiO_2$. 5,270 g. of powdered sodium zeolite A containing 20.3% of water (=4,200 g. of anhydrous zeolite) were added to this fiber suspension and homogeneously dispersed in it with an intensive mixer. The completed silica sol/zeolite suspension had a pH value of 9.1 and a density of 1.56 g./ml.

In addition, 300 g. of finely divided magnesium oxide known commercially as "magnesia usta extra leicht," obtained by thermally decomposing basic magnesium carbonate, were suspended in 5 liters of water. The suspension was left standing for at least 1 hour before use.

Following the procedure described in German patent specification No. 1,165,562, approximately 12 liters per hour of the silica sol/zeolite suspension and 1.1 liters per hour of the magnesium oxide suspension were delivered to a mixer by means of metering pumps, and the mixed suspensions dispersed in the form of droplets in an organic liquid. The organic liquid consisted of a mixture of perchlorethylene and o-dichlorbenzene, and had a density of 1.52 g./ml. The drops of the suspension which hardened into gel-bonded spheres sank to the bottom of the organic liquid, were removed from it by means of a sieve and dried in a stream of air heated to 40° C. Apart from some traces of magnesium oxide (approximately 0.6%), the granulates contained the following constituents, based on anhydrous substance:

| | Percent |
|---|---|
| Sodium zeolite A | 81.1 |
| $SiO_2$ binder | 16.5 |
| Glass fibers | 2.4 |

A 4–5 mm. fraction was sifted out for testing purposes. The activated binder-containing granulates had a bulk density of 548 g./liter and a "breaking hardness" of 8.0 kg. The activated granules did not explode when dropped into water.

(II) Conversion into binder-free granulates

Some of the granulates prepared as described in section (I), dried but not activated, were treated as follows: 310 g. of air-dry granulate containing 19.3% of water (=250 g. of anhydrous granulate) were introduced into a glass column provided with a sieve plate and covered with 452 ml. of a sodium aluminate solution which was 1.1 molars in $Al_2O_3$ and 2.2 molars in $Na_2O$. The sodium aluminate solution was initially passed through the granule filling at ambient temperature for a period of 16 hours, during which time it was continuously recirculated by pumps, and then heated for 5 hours to 45° C. and then for a further 3 hours to 80° C. The granulates were then washed free from alkali. The still wet granulates consisting of binder-free sodium zeolite A were used for further processing into potassium-exchanged granulates with a pore diameter of approximately 3 A.

(III) Potassium exchange

The washed granulates according to section (II) were subjected to ion exchange in the glass column with a KCl solution which was recirculated by pumps through the granule filling. The KCl solution contained 70 g. of KCl in 350 ml. of $H_2O$. The solution was pumped around for 4 hours at 30° C., and the procedure repeated twice more, on each occasion with fresh solution. The granules were then washed free from chloride, dried in air and activated in a stream of dried, hot air at 230° C.

The treatments described in (II) and (III) produced an increase in the weight of the granules used (250 g., based on anhydrous product) to 315 g. Apart from 1.9% by weight of glass fibers, the product now only contained potassium-sodium zeolite A (approximately 50% exchange) and no $SiO_2$ binder.

A 4 to 5 mm. fraction was again sifted out for testing purposes. The bulk density amounted to 692 g./liter and the "breaking hardness" to 7.2 kg. The active granules did not explode when dropped into water.

EXAMPLE 2

1,330 ml. of the same silica sol as in Example 1, 10 ml. of 5 normal hydrochloric acid, 330 ml. of $H_2O$, 23.5 g. of the same glass fibers as used in Example 1, 2920 g. of powdered sodium zeolite A containing 20.5% of water were processed as described in Example 1 into a silica sol/zeolite suspension with a pH value of 9.1 and a density of 1.56 g./ml. Granulation into a binder-containing sodium-zeolite A-granulate and then into a binder-free potassium-sodium zeolite A-granulate was carried out in the same way as described in Example 1.

The binder-containing sodium-zeolite A-granulate had the following composition:

| | Percent |
|---|---|
| Sodium zeolite A | 82.5 |
| $SiO_2$ binder | 16.8 |
| Glass fibers | 0.8 |

The powder density amounted to 604 g./liter and the "breaking hardness" to 7.1 kg. The active granules did not explode when dropped into water.

The binder-free potassium-sodium zeolite A-granulate (initially weighing 250 g.) obtained therefrom in accordance with Example 1, sections (II) and (III) weighed 310 g., contained 0.65% of glass fibers, had a bulk density of 748 g./ml. and a "breaking hardness" of 7.2 kg. The active granules did not explode when dropped into water.

EXAMPLE 3

By way of contrast to the preceding examples, an even smaller quantity of glass fibers was used. 1295 ml. of silica sol, 12 ml. of 5 normal hydrochloric acid, 340 ml. of $H_2O$, 11.4 g. of glass fibers and 2,800 g. of powdered sodium zeolite A containing 18.4% of water were granulated as described in Example 1, treated with sodium aluminate solution and exchanged with a KCl solution.

The binder-free, potassium-sodium zeolite A-granulate contained 0.35% of glass fibers, had a powder density of 765 g./liter and a breaking hardness of 7.0 kg. 70% of the granules burst open when dropped into water. Accordingly, the glass fiber content was not sufficient to obtain an improvement in strength in the "splitting test."

EXAMPLE 4 (COMPARISON EXAMPLE)

In Example 4, other fibers were worked into the granulates instead of glass fibers. The starting materials (except for the glass fibers), the quantitative ratios and also the processing stages were exactly the same as in Example 1.

EXAMPLE 4(a)

126 g. of asbestos fibers were used instead of 126 g. of glass fibers.

EXAMPLE 4(b)

42 g. of cellulose fibers (powdered cellulose) were used instead of 125 g. of glass fibers. It was impossible to incorporate the powdered cellulose in the same quantity by weight as the glass fibers because the cellulose fibers are of a lower specific gravity than glass fibers and for this reason alone a relatively small quantity has an equivalent thickening effect upon the suspension.

EXAMPLE 4(c)

In order to render possible a comparison with granulates that do not contain any fibers at all, a silica filler was used instead of glass fibers in Example 4(c) in order to obtain substantially the same bulk density. In order to be able to compare the different products fairly with one another, it is essentially that the products in question should have substantially the same bulk densities and hence substantially the same pore volumes. A large-surface pure silica with a specific BET surface of 180 m.$^2$/g., obtained by precipitating a sodium silicate solution with acid, was used as the silica filler.

2,290 ml. of silica sol, 13 ml. of 5-normal hydrochloric acid, 1,095 ml. of H$_2$O, 202 g. of silica filler and 5,220 g. of powdered sodium zeolite A with a water content of 22.9% were processed as described in Example 1 into a silica sol/zeolite suspension with a pH value of 8.85 and a density of 1.50 g./ml. The density of the organic liquid during granulation amounted to 1.45 g./ml. Granulation, treatment with sodium aluminate solution and ion exchange with KCl solution were carried out as described in Example 1. Since the silica filler, just like the SiO$_2$ binder, is converted into zeolite A during the treatment with sodium aluminate solution, the end product consisted of pure potassium-sodium zeolite A.

The figures obtained for the respective intermediate products and end products, i.e. the binder-containing sodium zeolite A-granulates and the binder-free potassium sodium zeolite A-granulates of Examples 4(a), 4(b) and 4(c), are set out in Table 1. The corresponding figures for the products of Example 1 prepared with glass fibers are also shown in this table for comparison purposes.

EXAMPLE 5

An effectively thermally insulated glass column provided with a sieve plate with an internal diameter of 35 mm. was filled to a height of 300 mm. with 3 A. zeolite granulate (approximately 200 g.). The zeolite was alternately charged with moist air until penetration of water at the outlet of the column and regenerated with moist hot air until a constant temperature prevailed at the outlet end of the column. Regeneration and charging were not separated by a cooling stage, the hot zeolite bed being directly cooled by the cold charging air. The air stream was regulated to 1.5 Nm.$^3$/h. during charging and regeneration, and adjusted by saturation with tempered water to a dew point of +20° C. During the regeneration period, air entered the column at a temperature of 210° C., a temperature of approximately 180° C. being obtained at the outlet end of the column towards the end of regeneration.

TABLE 2

|  | Products according to Example No. | | |
| --- | --- | --- | --- |
|  | 1 | 2 | 4c |
|  | Fibers added— | | |
|  | Glass fibers | | Silica filler |
| Fiber content, percent | 1.9 | 0.65 | 0 |
| Bulk density, g./liter | 692 | 748 | 688 |
| "Breaking hardness" after production, kg | 7.2 | 7.2 | 6.3 |
| Values after 45 charging cycles: | | | |
| "Breaking hardness," kg | 5.0 | 5.3 | 3.0 |
| Fragments sifted off, percent by weight | 0 | 0 | 2.0 |
| Drop test (percent of shattered granules) | 0 | 30 | 30 |
| Values after 105 charging cycles: | | | |
| "Breaking hardness," kg | 5.1 | 5.7 |  |
| Fragments sifted off, percent by weight | 0 | 0 |  |
| Drop test (percent of shattered granules) | 10 | 50 |  |

After a certain number of cycles, the zeolite granulate was removed from the column and was characterized by sifting out the fragments, measuring the "breaking hardness" and by the "drop test." Table 2 shows that the glass-

TABLE 1

|  | Product according to Example No. | | | |
| --- | --- | --- | --- | --- |
|  | 1 | 4a | 4b | 4c |
|  | Fibers added— | | | |
|  | Glass fibers | Asbestos fibers | Cellulose fibers | Silica filler |
| Fiber content, based on binder-containing granulate, percent | 2.4 | 2.4 | 0.8 | 2.4 |
| Binder-containing Na zeolite A-granulate: | | | | |
| Bulk density, g./liter | 548 | 565 | 570 | 517 |
| "Breaking hardness," kg | 8.0 | 5.3 | 6.9 | 5.2 |
| "Splitting test," percent; (explosion on dropping into water) | 0 | 0 | 0 | 0 |
| Binder-free K-Na-zeolite A-granulate: | | | | |
| Fiber content, percent | 1.9 | 1.9 | 0.6 | 0 |
| Bulk density, g./liter | 692 | 702 | 693 | 688 |
| "Breaking hardness," kg | 7.2 | 9.5 | 8.8 | 6.3 |
| "Splitting test," percent; (explosion on dropping into water) | 0 | 40 | 60 | 60 |

The end products of potassium-sodium zeolite A with a pore diameter of approximately 3 A. compared in the table all have substantially the same bulk density. Although the product of Example 1 produced with glass fibers does not have the highest "breaking hardness," it proved to be superior to all the others when subjected to the "splitting test," i.e. when the activated granules are dropped into water. This result is confirmed by the more involved long-term tests described in Example 5 which were carried out under simulated practical conditions with cyclic alternating temperature stressing and drop condensation during regeneration.

fiber-reinforced granulates leave not even traces of fragments both after 45 and even after 105 charging cycles. By contrast, a small quantity of fragments was detected after only 45 cycles in the case of the granulate according to Example 4(c). In addition, the originally satisfactory breaking hardness had been reduced by about half. On the other hand, Table 2 also demonstrates the effect which the quantity of glass fibers added has. Although in Example 2 a content of 0.65% was sufficient for completely stabilizing the granules against crushing and for maintaining a satisfactory level of breaking hardness, the drop test in which 30 and 50% of granules were shattered after 45 and 105 cycles, respectively, is an indication of a progressive loosening of the structure, whereas the product according to Example 1, containing 1.9% glass fibers, is substantially unchanged.

It will be appreciated that the instant specification and examples are set forth by way of illustration and not limitation and that various modifications and changes may be made without departing from the spirit and scope of the present invention.

What is claimed is:

1. Zeolite granulates with an increased resistance to changes in temperature and containing from about 0.3 to 10% by weight of glass fibers, based on anhydrous granulate.
2. A zeolite granulate according to claim 1, containing about 1 to 3% by weight of glass fibers.
3. A zeolite granulate according to claim 1, wherein the glass fibers are of E-glass.
4. A zeolite granulate according to claim 1, comprising potassium-sodium zeolite A with a pore diameter of approximately 3A. and a ratio of $K_2O$ to $K_2O+Na_2O$ of about 0.2 to 0.7.
5. A zeolite granulate according to claim 4, wherein the glass fibers are of E-glass and are present to the extent of about 1 to 3% by weight.
6. In the production of zeolite granulates including the steps of mixing powdered crystalline zeolite with an amorphous binder and liquid to form a plastic mixture, converting said mixture granulates, drying and hardening said granulates, the improvement which comprises including glass fibers in said mixture in an amount from about 0.3 to 10% based on the total weight of the dry granulates.
7. Process according to claim 6, wherein the amorphous binder comprises silica sol, the granulates ultimately produced being treated with sodium aluminate for converting the silica in the granulates into zeolite.

References Cited

UNITED STATES PATENTS

| | | | |
|---|---|---|---|
| 2,865,867 | 12/1958 | Van Dyke et al. | 252—455 Z |
| 3,189,563 | 6/1965 | Hauel | 252—455 R |
| 3,231,518 | 1/1966 | Church | 252—455 R |
| 3,210,267 | 10/1965 | Plank et al. | 252—455 Z |
| 3,296,151 | 1/1967 | Heinze et al. | 252—455 Z |
| 3,266,973 | 8/1966 | Crowley | 55—75 UX |

CARL F. DEES, Primary Examiner